United States Patent
Arnold et al.

(10) Patent No.: US 11,881,709 B2
(45) Date of Patent: Jan. 23, 2024

(54) EXTREMUM SEEKING CONTROL OF DISTRIBUTED ENERGY RESOURCES WITH DECAYING DITHER AND EQUILIBRIUM-BASED SWITCHING

(71) Applicant: United States Department of Energy, Washington, DC (US)

(72) Inventors: Daniel Arnold, Danville, CA (US); Michael Sankur, Emeryville, CA (US)

(73) Assignee: U.S. Departmet of Energy, Washingon, DC (US)

(*) Notice: Subject to any disclaimer, the term of this patent is extended or adjusted under 35 U.S.C. 154(b) by 100 days.

(21) Appl. No.: 17/145,259

(22) Filed: Jan. 8, 2021

(65) Prior Publication Data
US 2021/0234371 A1 Jul. 29, 2021

Related U.S. Application Data

(60) Provisional application No. 62/958,700, filed on Jan. 8, 2020.

(51) Int. Cl.
*H02J 3/18* (2006.01)
*H02J 3/38* (2006.01)
(Continued)

(52) U.S. Cl.
CPC .............. *H02J 3/18* (2013.01); *G05B 13/042* (2013.01); *H02J 3/32* (2013.01); *H02J 3/381* (2013.01); *H02J 2300/24* (2020.01)

(58) Field of Classification Search
CPC ...... H02J 3/18; H02J 3/32; H02J 3/381; H02J 2300/24; H02J 13/00006; H02J 2203/10;
(Continued)

(56) References Cited

U.S. PATENT DOCUMENTS

2016/0218639 A1* 7/2016 Eren ................. H02M 7/53871

OTHER PUBLICATIONS

D. B. Arnold, M. D. Sankur, etc., "Model-Free Optimal Coordination of Distributed Energy Resources for Provisioning Transmission-Level Services," [online], in IEEE Transactions on Power Systems, vol. 33, No. 1, pp. 817-828, Jan. 2018 [retrieved on Jun. 22, 2022], doi: 10.1109/TPWRS.2017.2707405. (Year: 2018).*

* cited by examiner

*Primary Examiner* — Charles Cai
(74) *Attorney, Agent, or Firm* — Timothy L. Harney; Daniel Park; Brian J. Lally

(57) ABSTRACT

Embodiments relate to an operating system coupled to and controlling at least one Distributed Energy Resource (DER) in a smart grid and includes an electricity distribution network and a 2-dimensional Extremum Seeking (2D-ES) controller coupled to network. The electricity distribution network has first and second inputs and one output and maps all active power and reactive power inputs to the smart grid providing measurements of an objective function. The 2D-ES controller controls the DER and includes an active power loop and a reactive power loop. The active power loop is in communication with the first input and the output, governs active power contribution, and receives measurements of the objective function which contain static and oscillatory components. The reactive power loop is in communication with the second input and the output, governs reactive power contribution, and receives measurements of the objective function which contain static and oscillatory components.

11 Claims, 11 Drawing Sheets

(51) Int. Cl.
  *G05B 13/04* (2006.01)
  *H02J 3/32* (2006.01)
(58) Field of Classification Search
  CPC . H02J 2203/20; H02J 3/48; H02J 3/50; G05B 13/042; G05B 13/0205; Y02E 10/56
  See application file for complete search history.

EXTREMUM SEEKING CONTROL OF DISTRIBUTED ENERGY RESOURCES WITH DECAYING DITHER AND EQUILIBRIUM-BASED SWITCHING

CROSS-REFERENCE TO RELATED APPLICATION

This application claims the benefit of U.S. Provisional Application No. 62/958,700 filed on Jan. 8, 2020, the disclosure of which is incorporated herein by reference in its entirety.

STATEMENT OF GOVERNMENT SUPPORT

The United States Government has rights in this invention pursuant to Contract No. DE-AC02-05CH11231 between Lawrence Berkley National Laboratory and the U. S. Department of Energy.

FIELD OF THE INVENTION

Embodiments relate to distributed energy resources such as solar photovoltaic (solar PV) devices and battery storage and the like. More specifically embodiments relate to control of the participation of distributed energy resources (DER) including solar PV and battery storage on an electricity grid using an algorithm for example.

BACKGROUND

Optimal control of Distributed Energy Resources (DER) is a critical component in the proper operation of the electric distribution grid in the near future. However, many optimization-based approaches for managing DER require knowledge of the underlying distribution system topology, network impedances, and access to feeder-wide real time load information. In order to ameliorate these requirements, it is proposed that a 2-dimensional Extremum Seeking (2D-ES) control system and method be used to manage DER active and reactive power contributions. In one embodiment, the 2D-ES system and method is augmented with an exponentially decaying probing (dither) signal that activates based on an equilibrium-based switching criteria. This approach enables substation real and reactive power target tracking with dither signals that exponentially decay once the individual ES controllers have each reached their optimum values.

One skilled in the art would recognize that control of Distributed Energy Resources (DER) is a critical component of a Smart Grid. As DERs continue to proliferate, it is expected that these devices will contribute significantly to maintaining the efficient and reliable operation of the electric power distribution system. Already, there is concern that the present level of DERs deployed in the distribution grid will adversely affect grid reliability and resiliency. These worries will undoubtedly increase as the number of DERs (particularly solar PV systems) grow over the next several decades. In places like California, which recently mandated the installation of solar PV systems on all new builds beginning in 2020, it will behoove grid operators to utilize DERs to support the safe and efficient transfer of electricity in their systems.

A need exists in the art to support the safe and efficient transfer of electricity. A need exists for systems and methods for controlling energy resources such as solar PV devices and battery storage and the like.

SUMMARY

One embodiment relates to a system for controlling distributed energy resources in an electrical distribution grid, comprising 2-dimensional Extremum Seeking controllers adapted to control distributed Energy Resources; and a switch device incorporating equilibrium-based switching criterion.

One or more embodiments relates to an operating system coupled to and controlling at least one Distributed Energy Resource (DER) in a smart grid, where the operating system includes an electricity distribution network and a 2-dimensional Extremum Seeking (2D-ES) controller coupled to network. The electricity distribution network has first and second inputs and one output, where the network maps all active power and reactive power inputs to the smart grid and provides measurements of an objective function. The 2D-ES controller controls that at least one DER in the smart grid, where the 2D-ES controller includes an active power loop and a reactive power loop. The active power loop governs active power contribution, where the active power loop is in communication with the first input and the output and receives measurements of the objective function which contain static and oscillatory components. a reactive power loop that governs reactive power contribution. The reactive power loop is in communication with the second input and the output and receives measurements of the objective function which contain static and oscillatory components.

Another embodiment relates to an operating system coupled to and controlling at least one Distributed Energy Resource (DER) in a smart grid, where the operating system includes an electricity distribution network and a 2-dimensional Extremum Seeking (2D-ES) controller coupled to network. The electricity distribution network has first and second inputs and one output and maps all active power and reactive power inputs to the smart grid and providing measurements of an objective function. The 2D-ES controller controls that at least one DER in the smart grid, where the 2D-ES controller includes an active power loop, a first summation device, a reactive power loop and a second summation device. The active power loop governs active power contribution, is in communication with the first input and the output, and receives measurements of the objective function which contain static and oscillatory components. The first summation device is coupled to the first input and the active power loop and receives first integrated signals form the active power loop and summing the first integrated signals with a cosine function forming input signals to the network at the first input. The reactive power loop governs reactive power contribution, is in communication with the second input and the output, and the reactive power loop receives measurements of the objective function which contain static and oscillatory components. The second summation device is coupled to the second input and the reactive power loop, the second summation device receives second integrated signals and sums the second integrated signals with a second sine function forming input signals to the objective device at the second input.

Still another embodiment relates to an operating system coupled to and controlling at least one DER in a smart grid, where the operating system includes a system and a plurality of 2-dimensional Extremum Seeking (2D-ES) controllers. The system has first and second inputs and one output, where the system maps all active and reactive power of power flows of the smart grid and provides measurements of an objective function. The plurality of 2D-ES controllers operate in parallel to minimize, or maximize, the same objective function value, where each of the 2D-ES controllers includes active and reactive power loops and first and second summation devices. The active power loop is in communication with the first input and the output governs active power contribution, the active power loop in communication with the first input and the output, wherein the active power loop receives measurements of the objective function which contain static and oscillatory components. The first summation device is coupled to the first input and the active power loop, where the first summation device receives first integrated signals form the active power loop and sums the first integrated signals with a cosine function forming input signals to the system at the first input. The reactive power loop is in communication with the second input and the output and governs reactive power contribution, where the reactive power loop receives measurements of the objective function which contain static and oscillatory components. The second summation device is coupled to the second input and the reactive power loop, and receives second integrated signals and sums the second integrated signals with a second sine function forming input signals to the objective device at the second input.

One or more embodiments of the present invention includes a highpass filter in communication with the network wherein the highpass filter removes a static/Direct Current (DC) component of objective function measurements, forming first filtered signals; a multiplier device in communication with the highpass filter that multiplies the first filtered signals with a first cosine function forming first multiplied signals; a lowpass filter coupled to the multiplier device, the lowpass filter receiving the first multiplied signals and forming second filtered signals; an integrator device coupled to the lowpass filter, the integrated device receiving the second filtered signals and forming first integrated signals; and/or a summation device coupled to the first input and the integrator, the summation device receiving the integrated signals and summing the integrated signals with a second cosine signal with a time-varying amplitude.

One or more embodiments of the present invention includes a highpass filter in communication with the network wherein the highpass filter removes a static/DC component of objective function measurements, forming third filtered signals; a multiplier device in communication with the highpass filter that multiplies the third filtered signals with a first sine function forming second multiplied signals; a lowpass filter coupled to the multiplier device, the lowpass filter receiving the first multiplied signals and forming fourth filtered signals; an integrator device coupled to the lowpass filter, the integrated device receiving the fourth filtered signals and forming first integrated signals; and/or a summation device coupled to the first input and the integrator, the summation device receiving the integrated signals and summing the integrated signals with a second sine signal with a time-varying amplitude.

BRIEF DESCRIPTION OF THE DRAWINGS

The invention together with the above and other objects and advantages will be best understood from the following detailed description of the preferred embodiment of the invention shown in the accompanying drawings, wherein:

FIG. 9A illustrates the monotonic increase in reference values between simulation time of 60 and 90 seconds and FIG. 9B illustrates the low-pass filtered objective function for node 735 and the switching threshold values;

DETAILED DESCRIPTION

Figure 1:
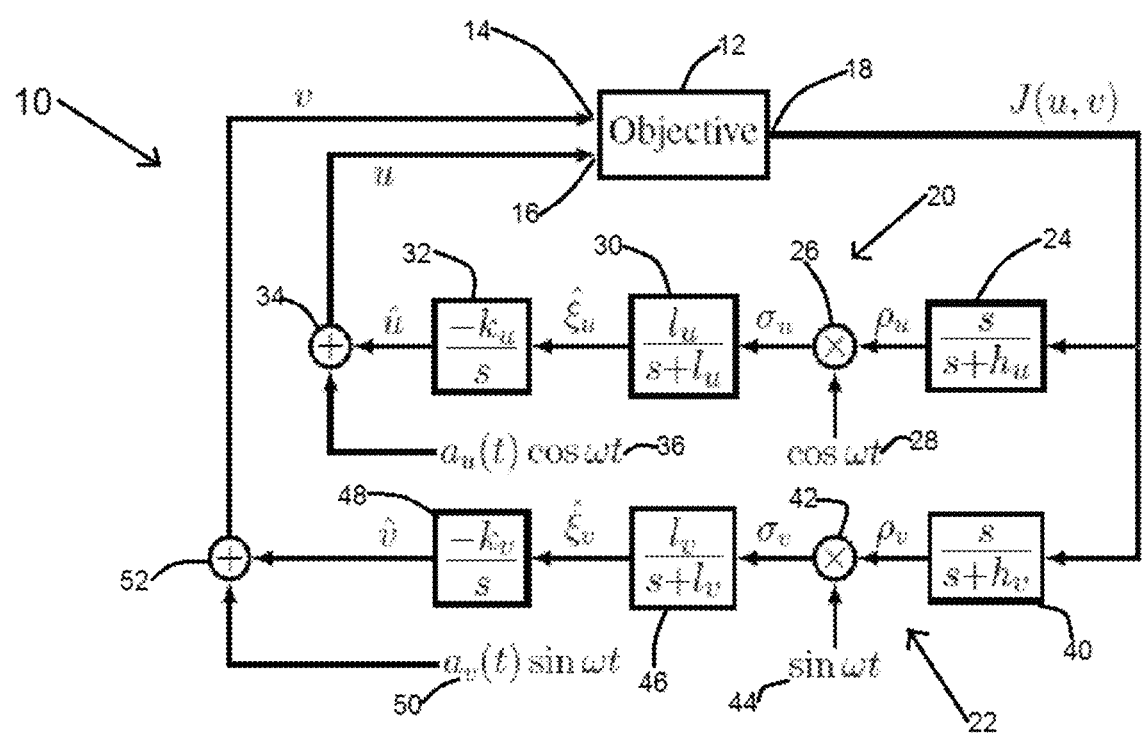
FIG. 1 depicts a block diagram of a 2D-ES control loop for a single controller.

The following detailed description should be read with reference to the drawings in which similar elements in different drawings are numbered the same. The drawings, which are not necessarily to scale, depict illustrative embodiments and are not intended to limit the scope of the invention.

One or more embodiments of the present invention relate to distributed energy resources (DER) such as solar PV devices and battery storage devices and the like. More specifically embodiments relate to control of the participation of one or more DERs including solar PVs and battery storage devices on an electrical grid using a system and method employing an algorithm for example. The algorithm turns off a probing signal under certain conditions to reserve remaining capacity of the DER device without using any information from the grid. The method could potentially save 5-10% of device power. The algorithm could be installed in the device through firmware for example. The targeted users of the algorithm could potentially be power aggregators, solar inverter operators, or utilities.

One or more embodiments relates to optimal control of Distributed Energy Resources (DER) which is a critical component in the proper operation of the electric distribution grid in the near future. However, known optimization-based approaches for managing DER require knowledge of the underlying distribution system topology, network impedances, and access to feeder-wide real time load information. In order to ameliorate these requirements, it is proposed that a 2-dimensional Extremum Seeking (2D-ES) control method be used to manage DER active and reactive power contributions. In one embodiment, the 2D-ES system and method is augmented with an exponentially decaying probing (dither) signal that activates based on an equilibrium-based switching criteria. This approach enables substation real and reactive power target tracking with dither signals that exponentially decay once the individual ES controllers have each reached their optimum values.

The literature reveals that there are no shortage of strategies that consider how DERs should be managed to realize this vision. Practitioners of mathematical optimization often cast control of DERs in distribution grids as a mathematical program (popularly referred to as Optimal Power Flow, or OPF). A decision-making process-Semi-Definite Program (SDP)—was formulated.

One drawback of the ES approach is the use of a dither signal that causes persistent exploration of the local decision space, which is needed to estimate gradients for the optimization process. The presence of the dither (e.g. probing signal) implies convergence of the ES method to a neighborhood of the optimizer, not the exact value. Though not necessarily a drawback in all applications, when controlling active and reactive power contributions of DER, the probing signal injected in active and reactive power channels may have an opportunity cost as they may prevent the device from maximizing its economic value under certain compensation schemes (by using inverter capacity to probe in the reactive power channel instead of using that capacity for real power injection). Furthermore, the oscillating probes contribute to system losses and may cause other undesirable harmonic content.

Embodiments considered herein significantly alleviates these concerns through introducing an exponentially decaying probe when the individual DER have optimized their portion of the objective function. In so doing, each ES controller will converge to a final value that is closer to the true optimizer and within the neighborhood of attraction when the probing signal is active.

Alternative dither signals (or even the removal of the dither) in ES have been considered in the past, but these techniques do not consider decaying dither when multiple ES controllers are operating in parallel. A Lyapunov-based switching criteria has been used to begin the probing signal decay process. However, this switching criteria utilizes knowledge of the underlying system to calculate the Lyapunov function value that governs the decision to switch to decay mode. In the context of controlling DER, this underlying system knowledge translates into system modeling information which may not be available.

In order to enable multiple ES controllers, each managing a separate DER, to have decaying dither signals (that does not utilize any exogenous information about the distribution grid), an equilibrium-based switching criterion that governs when the probes of the 2D-ES controllers begin to exponentially decay is contemplated. Embodiments are contemplated in which DERs are used to enable substation active and reactive power target tracking. In such embodiments, all of the controllable DER in a given feeder work together to enable the feeder point of common coupling to have a controllable active and reactive power values. This enables using a framework that allows the feeder to act as an aggregate resource—a step closer to participating in electricity markets or regulation services. In one or more embodiments, the ability of the 2D-ES controllers to track active and reactive power setpoints, which may change at fixed intervals, with a decaying dithers are contemplated. Upon setpoint change, the dither signal is re-activated, allowing the controllers to successfully track the new target.

In one or more embodiments, individual photovoltaic inverters, each controlled by a separate extremum seeking (ES) controller, modulate their active and reactive power consumptions/injections sinusoidally. These sinusoids propagate through the network, affecting system voltages and power flows. Measurements from locations in the network where DER are to be used regulate system states are then collected. From these measurements, a system-wide fitness function (essentially an OPF objective function) is computed and broadcast to all inverters. Using this broadcast objective, which is a scalar value, the ES controllers can extract their respective gradients needed to perform optimization. Obviously, the speed of the approach is dependent on the rate at which data can be collected from points of interest in the network and the speed of objective function computation and broadcast. The overall method presents less of a burden from an implementation standpoint as it only requires measurements at points of the network where control action is desired (unlike centralized OPF approaches that require knowledge of all system loads).

Optimal control of DERs may be a critical component for proper operation of the electric distribution grid in the near future. However, many optimization-based approaches for managing DER require knowledge of the underlying distribution system topology, network impedances, and access to feeder-wide real time load information. In order to ameliorate these requirements, embodiments of the present invention use a 2D-ESs control system and method to manage DER active and reactive power contributions. In at least one embodiment, the 2D-ES system and method is augmented with an exponentially decaying probing (dither) signal that activates based on an equilibrium-based switching criteria. Our simulation results show that the approach can enable substation real and reactive power target tracking with dither signals that exponentially decay once the individual ES controllers have each reached their optimum values.

While OPF formulations are attractive as they can achieve very high levels of performance in terms of solution optimality, these methods typically rely on knowledge of the system model (topology and line segment impedances) and access to global load consumption information. Additionally, the success of these techniques is predicated on the existence of a communications infrastructure to relay sensing and actuation signals between DER and (possibly) a centralized decision-maker. The up-front cost and upkeep of such an infrastructure may prohibit such techniques from being realized in practice.

To address these issues, embodiments include applying Extremum Seeking (ES) to manage DERs. ES is a nonlinear control technique that has become increasingly popular due to the ability of the approach to perform optimization in real time, without any knowledge of the system over which it is optimizing. This technique is robust to plants with dynamics provided those dynamics act on a slower timescale than that of the ES control. Embodiments have utilized two dimensional Extremum Seeking control to simultaneously manage the active and reactive power output of a controllable DER (where a separate ES loop is used to manage each power channel). One or more embodiments alleviates the need for exogenous information such as network models, global knowledge of loads, and a large communications infrastructure. The approach has been shown to be robust to disturbances caused by intermittent renewable generation, changing loads, and the switching of legacy voltage regulation equipment. Obviously, the ability to control the real power output of PV arrays or battery storage systems is dependent on the availability of sufficient solar insolation or battery state of charge.

In one or more embodiments, individual DER, each controlled by a separate 2D-ES controller, modulate their active and reactive power consumptions/injections sinusoidally. These sinusoids propagate through the network, affecting system voltages and power flows. Measurements from locations in the network where DER are to be used regulate system states are then collected. From these measurements, a system-wide fitness function (essentially an OPF objective function) is computed and broadcast to all DER. Using this broadcast objective, which is a scalar value, the ES controllers can extract their respective gradients needed to perform optimization. It should be appreciated that the speed of the approach is dependent on the rate at which data can be collected from points of interest in the network and the speed of objective function computation and broadcast. The overall scheme presents less of a burden from an implementation standpoint as it only requires measurements at points of the network where control action is desired (unlike centralized OPF approaches that require knowledge of all system loads). The ES approach has been successfully demonstrated in a power hardware in the loop environment in controlling real PV inverters for feeder voltage regulation.

It should be appreciated that alternative dither signals (or even the removal of the dither!) in ES have been considered previously, but these techniques do not consider decaying dither when multiple ES controllers are operating in parallel. In a closely related work, the authors of introduce a Lyapunov-based switching criteria to begin the probing signal decay process. However, this switching criteria utilizes knowledge of the underlying system to calculate the Lyapunov function value that governs the decision to switch to decay mode. In the context of controlling DER, this underlying system knowledge translates into system modeling information which may not be available.

Let $\mathcal{G} = (\mathcal{N}, \mathcal{L})$ represent a balanced radial distribution system being served by a transmission system link. Here $\mathcal{N}$ is the set of nodes of the feeder, where $\mathcal{N} \triangleq \{\infty, 0, 1, \ldots n\}$. In this notation, node 0 refers to the distribution system substation, and node $\infty$ represents the transmission system, which is treated as an infinite bus (it is assume control actions taken by the DER do not affect voltage at node $\infty$).

The DistFlow equations (equations [14]) represent the relationship between real and reactive power flows and squared voltage magnitudes between adjacent nodes in $\mathcal{G}$ (Equations. (1)-(4)).

$$P_i = p_i + u_i + \Sigma_{j:(i,j) \in \mathcal{L}} (P_j + r_{ij} l_{ij}) \quad (1)$$

$$Q_i = q_i + v_i + \Sigma_{j:(i,j) \in \mathcal{L}} (Q_j + x_{ij} l_{ij}) \quad (2)$$

$$y_i = y_j + 2r_{ij} P_j + 2x_{ij} Q_j + (r_{ij}^2 + x_{ij}^2) l_{ij} \quad (3)$$

$$l_{ij} = \frac{P_j^2 + Q_j^2}{y_j}, \forall (i,j) \in \mathcal{N} \backslash \infty \quad (4)$$

In these equations, $P_i$ and $Q_i$ represent the active and reactive power flowing into node i, $p_i$ and $q_i$ represent node i active and reactive power demand (i.e. the load), and $u_i$ and $v_i$ denote the active and reactive powers that can be injected/consumed by DER at node i. Additionally, losses in that occur over line segment (i, j) are represented by $I_{ij}$, and $y_i$ represents the squared voltage magnitude at node i. Finally, $r_{ij}$ and $x_{ij}$ represent line segment (i, j) resistance and reactance.

Using the model outlines in Equations (1)-(4), the following Optimal Power Flow problem is formulated to track real and reactive power targets at the distribution substation while performing feeder voltage regulation:

$$\text{minimize}_{u,v,yi,Pi,Qi} \ \alpha_P(P_0 - P_t)^2 + \alpha_q(Q_0 - Q_t)^2 \quad (5)$$

subject to: (1) – (4)

$$\underline{y}_i \leq y_i \leq \overline{y}_i, i \in \mathcal{B},$$

$$\underline{P}_i \leq P_i \leq \overline{P}_i, i \in \mathcal{L},$$

$$\underline{Q}_i \leq Q_i \leq \overline{Q}_i, i \in \mathcal{L},$$

$$\underline{S}_i \leq \sqrt{P_i^2 + Q_i^2} \leq \overline{S}_i, i \in \mathcal{L},$$

$$\underline{u}_i \leq u_i \leq \overline{u}_i, i \in \mathcal{N},$$

$$\underline{v}_i \leq v_i \leq \overline{v}_i, i \in \mathcal{N}$$

$$\underline{w}_i \leq \sqrt{u_i^2 + v_i^2} \leq \overline{w}_i, i \in \mathcal{N},$$

Where $P_t$ and $Q_t$ are the substation real and reactive power targets $\alpha_P$ and $\alpha_Q$ are scaling factors, and $B \subset \mathcal{N}$. Here, $u = [u_0, u_1, \ldots u_n]^T$ and $v = [v_0, v_1, \ldots v_n]$. Without loss of generality, it is assumed the existence of a four quadrant-capable DER at every node in $\mathcal{N}^{/\infty}$.

$\in \mathcal{N}$

Let the individual constraints in (5) be represented by the vector $c(y, P, Q, u, v) \in R^{b \times l}$ (i.e. there are b inequality constraints). In order to utilize 2D-ES control, Equation (5) is transformed into an equivalent form via making successive substitutions of the equality constraints into the inequality constraints and the objective function, and, subsequently, approximating the inequality constraints with penalty functions in the $$\text{minimize}_{u,v} \mathcal{J}(u,v) \quad (6)$$

where $$\mathcal{J}(u,v) = \alpha_P(P_0((u,v) - P_t)^2 + \alpha_Q(Q_0(u,v) - Q_t)^2 + \lambda_k \sum_{k=1}^{b} g(c_k(u,v)) \quad (7)$$

and $g(c_k(u,v)) = \max(0, c_k(u,v))^2$ with $\lambda_k$ positive It should be appreciated that the local convexity of Equation (7) was established in Equation (9).

FIG. 1 illustrates a block diagram of one embodiment of a 2D-ES system 10 with equilibrium-based switching and decaying probing amplitudes. The goal of at least one embodiment of the ES controller is to minimize a general convex objective that is, in this case, a function of two independent variables u and v. In FIG. 1, the Objective block or system 12 having two inputs 14, 16 and output 18 represents the mapping of all real and reactive power injections into the distribution grid powerflows and squared voltage magnitudes (see Equations (1)-(4)) that then are used to construct the objective function (see Equation (7)). The inputs 14 and 16 to Objective block or system 12 consist of sinusoidal perturbations of a u cos wt and a u sin wt added to respectively as shown in Equation (8).

$$u(t) = \hat{u}(t) + a_u(t)\cos(wt)$$

$$v(t) = \hat{v}(t) + a_v(t)\sin(wt) \quad (8)$$

These oscillations propagate throughout the network, resulting in an objective function J (u, v) that is comprised of both DC and oscillatory components. J (u, v) is then split into two channels that feed loops 20 and 22 governing the active and reactive power contributions of this DER. In each loop, the DC term is removed using a highpass filter 24, 40 and the subsequent signal is multiplied 26, 42 by cos wt 28 (in the u channel 20) and by sin ωt 44 (in the v channel 22). Each signal is then passed through a lowpass filter 30, 46 followed by an integrator 32, 48 before entering summation junction 34, 52 where they are added or summed with $a_u$ sin wt 36 and $a_u$ cos wt 50 used to reconstruct inputs to the Objective block or system 12 at inputs 14, 16.

Figure 2:
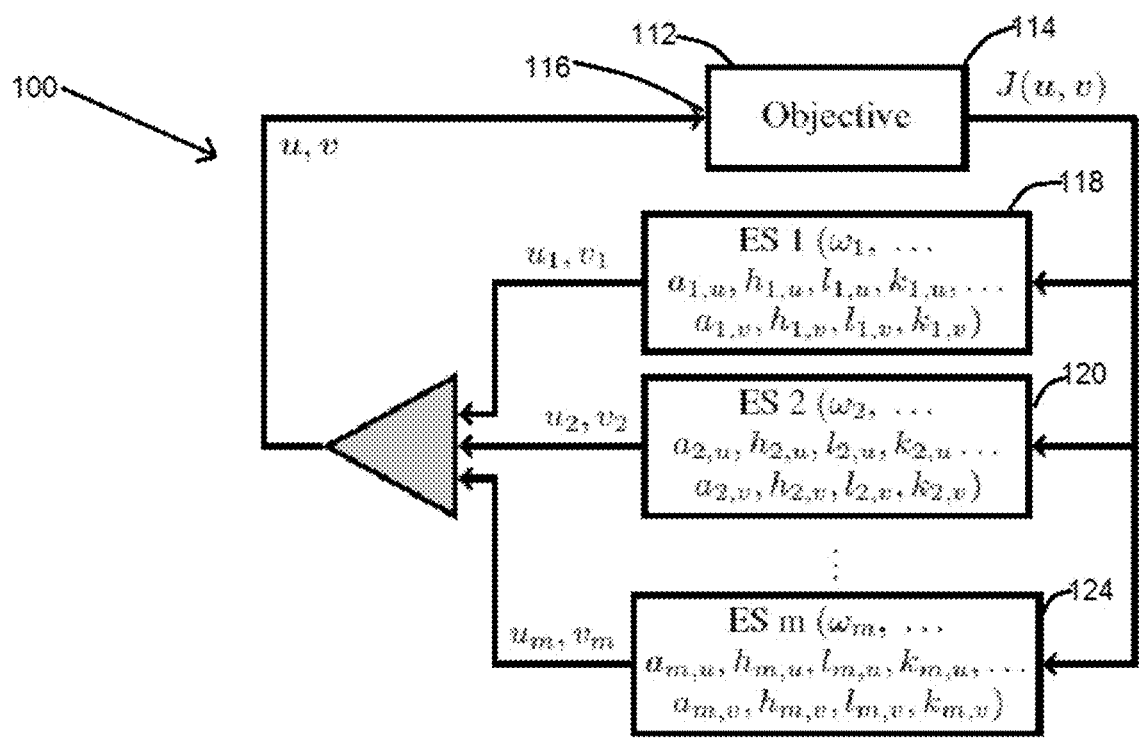
FIG. 2 depicts a block diagram of a parallel operation of multiple ES controllers.

FIG. 2 depicts a block diagram of a system 100 with parallel operation of m individual 2D-ES controllers, controllers 118, 120 and 122 for example, each controller situated at a different node in $\mathcal{G}$ and operating in parallel. As illustrated, each controller 118, 120 and 122 are in communication with objective block or system 112 at output 114 and input 116. In this embodiment it is assumed that the parameters for each of the 2D-Es controllers are all positive and the probing frequencies cannot add or subtract to equal another frequency. Again, it is assumed that the uniform probing amplitudes and high and low pass filter parameters (see Equation [9] for further explanation) for all controllers (though this assumption does not affect the stability of the approach).

It should be appreciated that the behavior of the system 100 can be separated into two modes of operation. "Normal mode" corresponds to periods when the ES probe amplitude probe amplitude is set and the simulation initial value and "decay" mode which corresponds to periods when the probe amplitude decays.

It should be appreciated that the switching logic is identical for both the real and reactive loops, save the choice of switching thresholds where Let the binary viable $\psi_i$ represent the state of the $i^{th}$ 2D-ES controller, where $\psi_i=0$ corresponds to "normal mode' and $\psi_i=1$ corresponds to a decaying dither signal (i.e., "decay mode"). Furthermore let $\overline{J}_i$ represent the lowest average objective function value recorded since the transition to $\psi=1$.

$$\overline{J}_i = \min \{J_{i,av}(\mathcal{T})\}, \forall \; \mathcal{T} \in [t_{i,aw}]$$

Here "av" refers to $$\frac{1}{T_i}\int_{t-T_i}^{t}(*)d\tau \text{ and } T_i = \frac{w_1}{2\pi}.$$

We define the logic governing switching from "normal mode" to "decay mode" (and vice versa) as:

$$\psi_i = \begin{cases} 0 \text{ if } |e_{i,av}| \geq \overline{e_i} \text{ or } J_{i,av} \geq \overline{J}_i + \varepsilon_i \\ 1 \text{ if if } |\varepsilon_{i,av}| \geq \overline{\varepsilon_i} \text{ and } |\sigma_{i,av}| \leq \overline{\sigma_i} \end{cases}$$

where $\overline{e}_i$, $\varepsilon_i$, $\xi_i$ and $\overline{\sigma}_i$ are small and positive. The variable is the averaged low-pass filtered version of the objective function $\mathcal{J}$ (i.e. $e_i = \mathcal{J}_{i,av} - \rho_{i,av}$).

The switching logic of Equation (10) will trigger a state change of the ES controller into "decay mode" when the controller enters into a small neighborhood around its equilibrium point. A derivation of the equilibrium point and the switching criterion can be found in the appendix. The controller will exit "decay mode" when the derivative of the averaged objective function exceeds a threshold, or if the objective function value increases away from $J_i$. The probe amplitude $a_i(t)$ in either state of $\psi_i$ is given by Equation (11), where $a^0$ is the $i^{th}$ probe initial value.

$$a_i(t) = \begin{cases} a_i^0 & \text{if } \psi_i = 0 \\ a_i^0 e^{(-n_i(t-t_{i,iw}))} & \text{if } \psi_i = 1 \end{cases} \quad (11)$$

It should be noted that the real and reactive power probes may have different switching parameters, nominal probe amplitude, probe decay rate, and probe decay start time $t_{i,sw}$. Following the change from $\psi_i=0$ to $\psi_i=1$, the probing amplitude of the $i^{th}$ ES controller will asymptotically approach 0, thereby allowing the controller output to reach a value closer to the true optimal.

Figure 3:
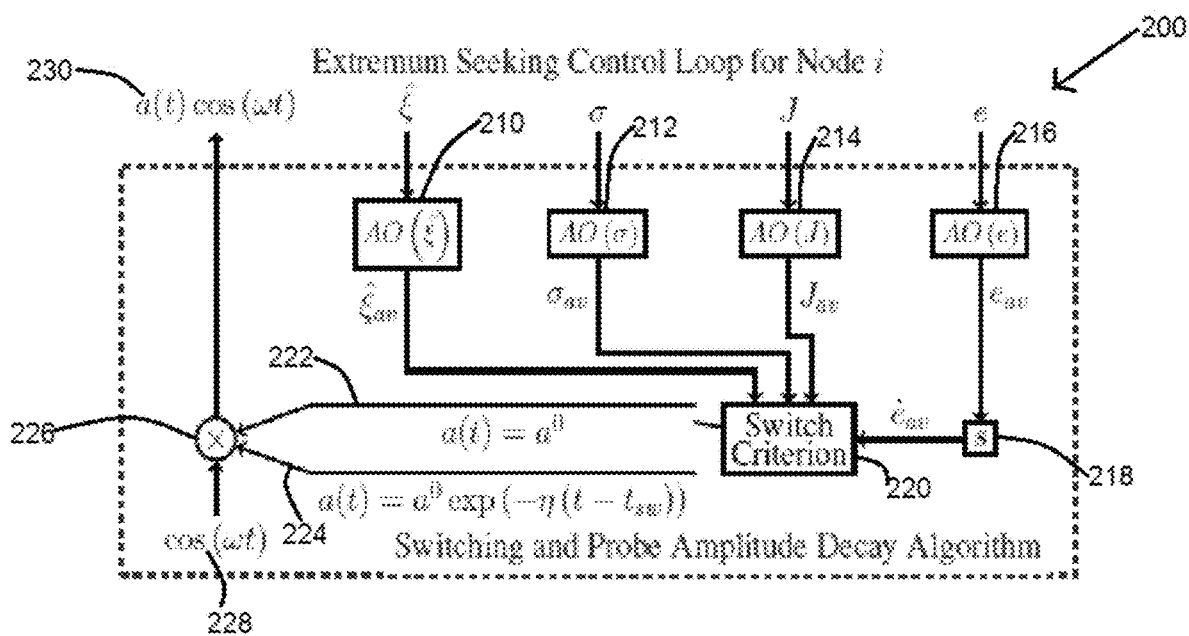
FIG. 3 depicts a block diagram of switched 2D-ES system with probe amplitude decay with an averaging operator (AO)

FIG. 3 depicts a block diagram of a switched 2D-ES system with probe amplitude and ES operation mode switching logic for the cosine loop in the 2D-ES scheme (this may be the active or reactive power loop depending on the specific implementation). The switching logic is identical, save for the sine loop after replacing cos(wt) with sin(wt). For clarity of presentation, the subscripts denoting node, and power loop are omitted. As illustrated in FIG. 3 the system 200 includes a plurality of averaging operators (AO) 210, 212, 214 and 216. As illustrated AO 216 is coupled to device 218 while AO 210, 212, 214 and 216 are shown coupled to switch criterion 220 which moves between branches 222 and 224. Branches 222 and 224 are multiplied via device 226 by cos(wt) 228 forming a(t) sin(wt).

In order to ensure the active and reactive power setpoints produced by the 2D-ES control algorithm were feasible with respect to DER real power, reactive power, and apparent power capacity constraints, the infeasible setpoints were rectified via process outlined in Algorithm 1.

---

Algorithm 1 Rectivation
algorithm for DEP Setpoints $\hat{w}_i = \hat{u}_i + j\hat{v}_i$
$a_i = a_{i,u} \cos(wt) + ja_{i,v} \sin(wt)$
  if $\hat{u}_i \leq \underline{u}_i + a_{i,u}$                      then
    $\hat{u}_i \leftarrow \underline{u}_i + a_{i,u}$
  end if
  if $\hat{u}_i \geq \overline{u}_i - a_{i,u}$                      then
    $\hat{u}_i \leftarrow \overline{u}_i - a_{i,u}$
  end if
  if $\hat{v}_i \leq \underline{v}_i + a_{i,v}$                      then
    $\hat{v}_i \leftarrow \underline{v}_i + a_{i,v}$
  end if
  if $\hat{v}_i \geq - a_{i,v}$                           then
    $\hat{v}_i \leftarrow \overline{v}_i - a_{i,v}$
  end if
  if $|\hat{w}_i + a_i| + > \overline{w_i}$                then
    $\hat{w}_i \leftarrow r_i^{max} + \hat{w}_i/|\hat{w}_i|$
  end if

---

In the last if statement of Algorithm 1, $r_i^{max}$ is the maximum of:

$$|r_i\cos\theta + jr_i\sin\theta + a_{i,u}\cos\delta + ja_{i,u}\sin\delta| \leq \overline{w_i} \quad (12)$$

over $\delta \in [0, 2\pi]$ where $\delta = acr\tan(\hat{v}_i/\hat{u}_i)$

Figure 4:
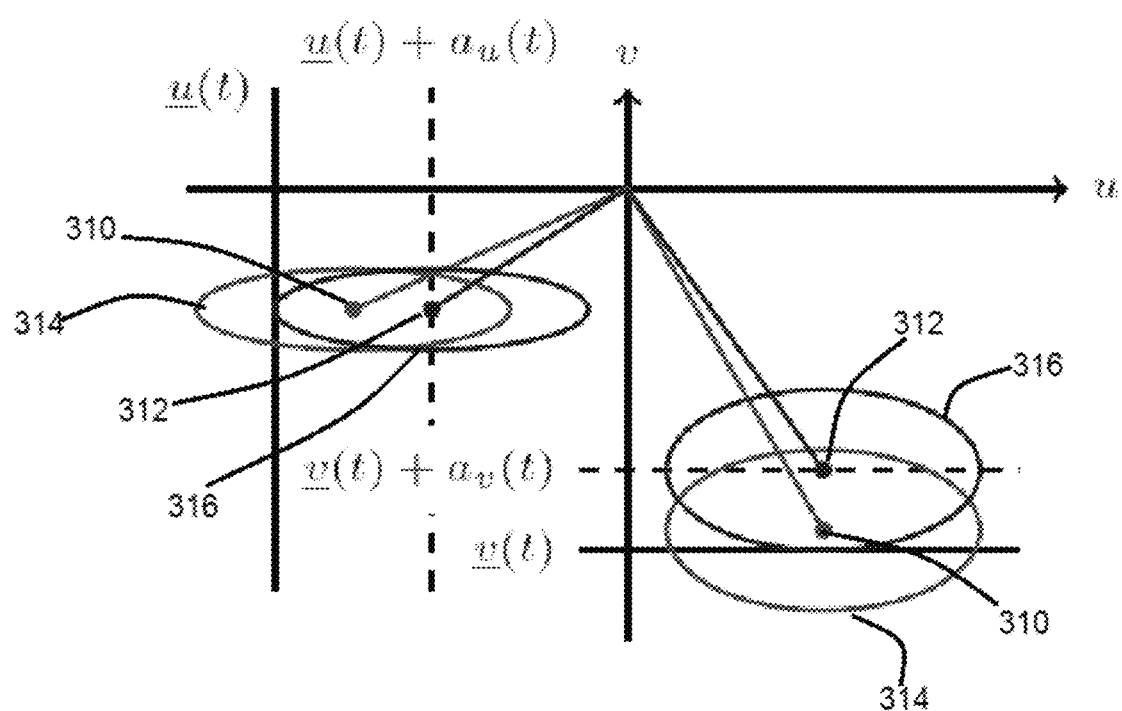
FIG. 4 depicts a graphical representation of rectification for minimum real power constraint and minimum reactive power constraint.
Figure 5:
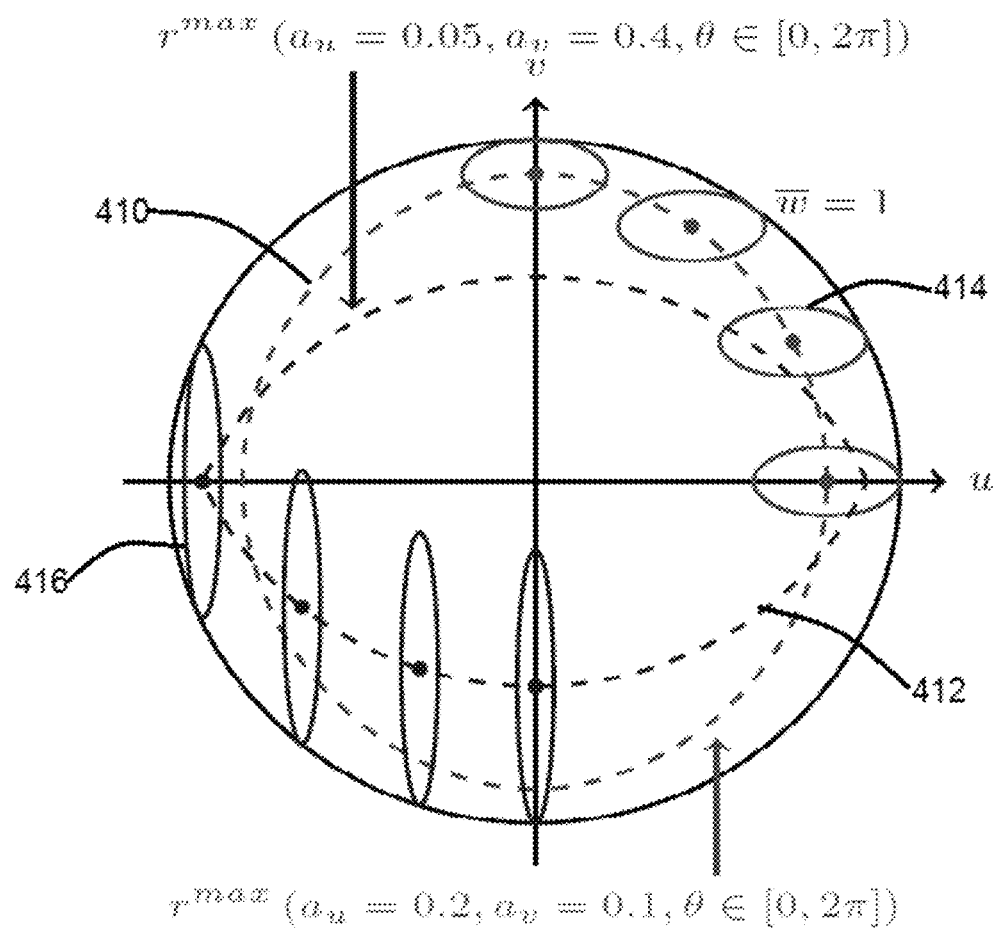
FIG. 5 depicts a graphical representation of the effective rectification for inverter apparent power constraints.

The rectification process is illustrated in FIG. 4 and FIG. 5 that show how setpoints computed by the ES controller are adjusted so that the DER output always remains feasible. In FIG. 4, infeasible setpoints are represented by red dots 310 and the rectified feasible setpoints are shown as blue dots 312. The ellipses 314, 316 represent the effect of the probing (dither) signal, that causes a perturbation around the present setpoint. In FIG. 5, dashed lines 410, 412 represent the boundary of the feasible setpoints for two cases of probes amplitudes, and ellipses 414, 416 represent the corresponding probes. Note that after rectification, the setpoint value plus the effect of the dither always remains feasible. This ensures that the ES controllers will always be able to extract the gradient of the objective function. In the event of probing amplitude decay, it will be necessary to continually evaluate Algorithm 1.

Figure 6:
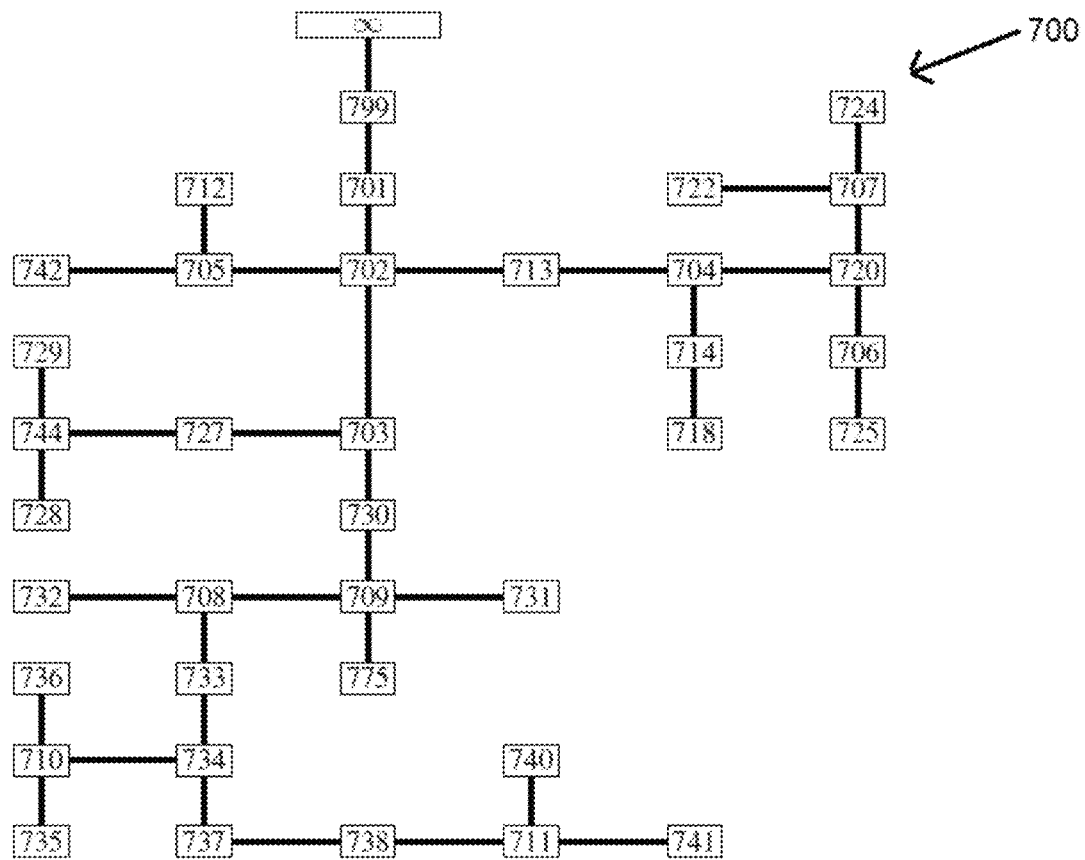
FIG. 6 depicts a block diagram of IEEE 37 mode test feeder topologies.

Simulations were conducted on a modified version of the IEEE 37 node test feeder (balanced), the topology of which are illustrated in FIG. 6. The voltage regulator between nodes 799 and 701 was omitted, and the switch between 709 and 775 was replaced by a line with configuration 724 and length of 50 ft. The network was balanced, such that all entities on phases b and c were eliminated, as were cross phase impedances. Network entities on phase a were retained. All demands were multiplied by a factor of 1.5. Loads were assumed to follow a ZIP model of the form:

$$p_i(y_i) = p_i\left(\beta_{i,s} + \beta_{i,ry}^{1/2} + \beta_{i,zy_i}\right) \quad (14)$$

$$q_i(y_i) = q_i\left(\beta_{i,s} + \beta_{i,by}^{\frac{1}{2}} + \beta_{i,zy_i}\right)$$

with ZIP model parameters:

$$\beta_{i,s} = 0.75, \beta_{i,l} = 0.10, \beta_{i,z} = 0.15 \ \forall_T \in \mathcal{N}$$

DERs were placed at nodes={702, 725, 729, 731, 735, 711}, and were assumed to be capable of four-quadrant operation. Each DER had its own 2D-ES controller allowing for simultaneous management of real and reactive power. The real and reactive control loops for each 2D-ES controller used the same probing frequency f, as defined in Table 1. All controller parameters, including high pass filter frequencies, low-pass filter frequencies, integrator gains, and initial probe amplitude can be found in Table 1. The same values for each parameter were assigned to both the real and reactive power control loops, and therefore have omitted the subscripts of u and v in Table 1. The dither decay rate, and switching criteria values are also given in Table 1

TABLE 1

| Node | $f_i$[Hz] | $h_i$[Hz] | $l_i$[Hz] | $k_i$ | $a_i^0$ | $\eta_i$ | $\xi\alpha\nu$ | $\sigma_{i,av}$ | $\bar{e}_{i,av}$ | $\varepsilon_i$ |
|---|---|---|---|---|---|---|---|---|---|---|
| 702 | 1.00 | 1.0 | 1.0 | 0.05 | 0.005 | 0.1 | 0.01 | 0.2 | 0.5 | 0.2 |
| 725 | $\sqrt{2}$ | 1.0 | 1.0 | 0.05 | 0.005 | 0.1 | 0.01 | 0.2 | 0.5 | 0.2 |
| 729 | $\sqrt{3/5}$ | 1.0 | 1.0 | 0.05 | 0.005 | 0.1 | 0.01 | 0.2 | 0.5 | 0.2 |
| 731 | $\sqrt{7/11}$ | 1.0 | 1.0 | 0.05 | 0.005 | 0.1 | 0.01 | 0.2 | 0.5 | 0.2 |
| 735 | | 1.0 | 1.0 | 0.05 | 0.005 | 0.1 | 0.01 | 0.2 | 0.5 | 0.2 |
| 711 | | 1.0 | 1.0 | 0.05 | 0.005 | 0.1 | 0.01 | 0.2 | 0.5 | 0.2 |

In experiments, the real power target, $P_t$ was set Time [s] to 0.35 p.u. for $0 \le t \le 30$, then 0.25 p.u. for $30 \le t \le 60$, then ramps linearly in time from 0.25 to 0.35 for $60 \le t \le 90$, then remains constant at 0.35 from $90 \le t \le 120$. The reactive power target, $Q_t$ was set to 0.15 p.u. for $0 \le t \le 30$, then 0.05 p.u. for $30 \le t \le 60$, then ramps linearly in time from 0.05 to 0.15 for $60 \le t \le 90$, then remains constant at 0.15 from $90 \le t \le 120$.

Figure 7:
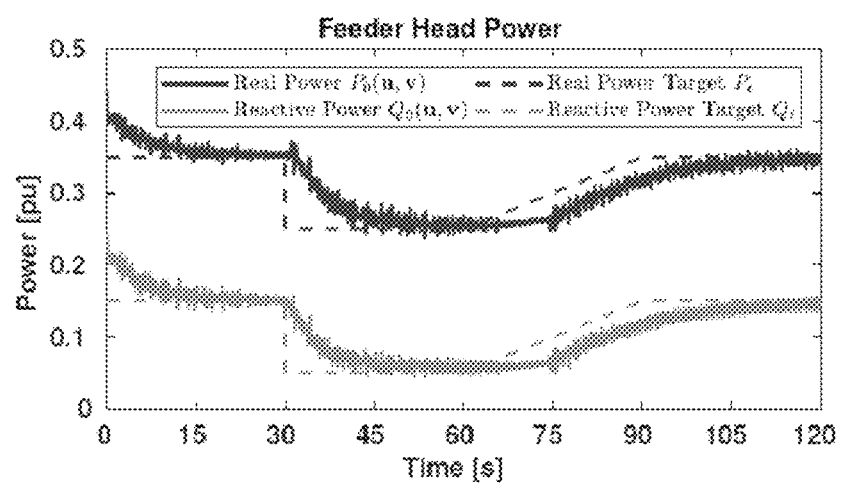
FIG. 7 depicts a graphical representation of the feeder head power and power references values.

FIG. 7 plots the feeder head real and reactive power, and the associated substation power targets. The 2D-ES controllers successfully converge to their respective targets when the targets are static, and follow the ramp function, albeit with some lag.

Figure 8:
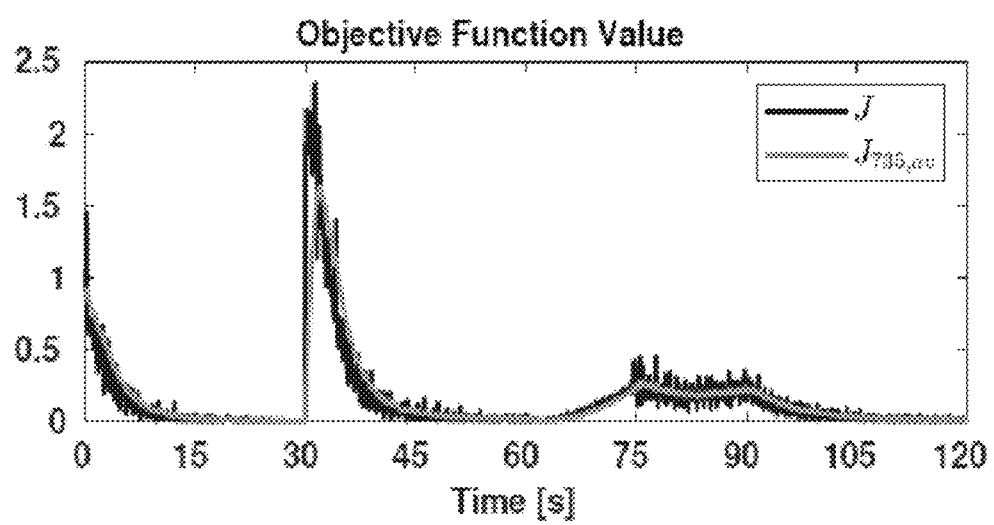
FIG. 8 depicts a graphical representation of objective function and low-pass filtered objective function, where the low-pass filtered objective function is the same for all controllers at all nodes.

FIG. 8 depicts a graphical representation illustrating the value of Equation 13 and the low-pass filtered objective function for node 735, objective function is shown in blue, and low-pass filtered objective function for node 735*m* is shown in green, where the low-pass filtered objective function is the same for all controllers at all nodes. As illustrated, the 2D-ES controllers collectively minimize the global objective function when tracking both sets of targets.

Figure 9A:
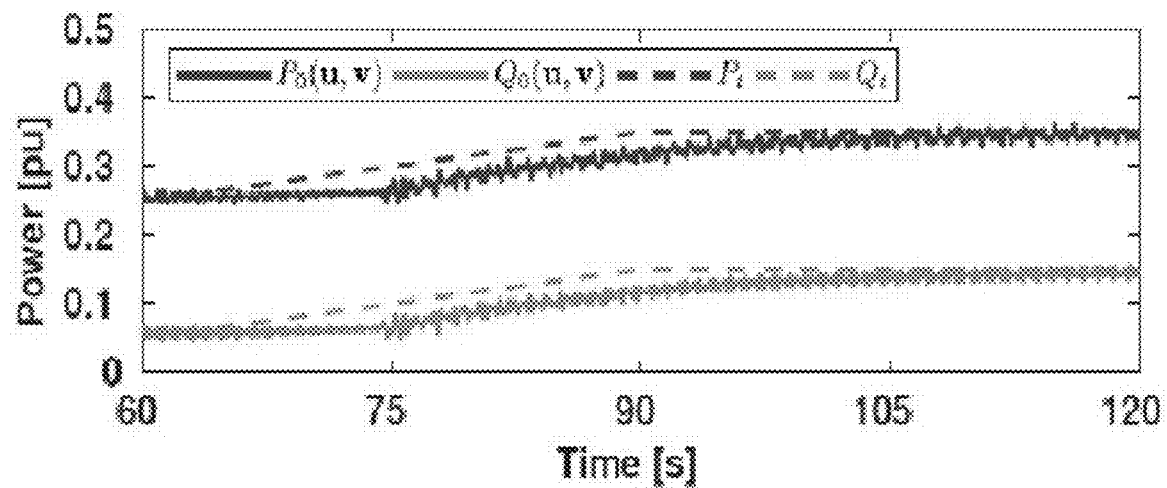
FIGS. 9A-9B depict graphical representations detailing the ramp in power reference values and switching criterion, where
Figure 9B:
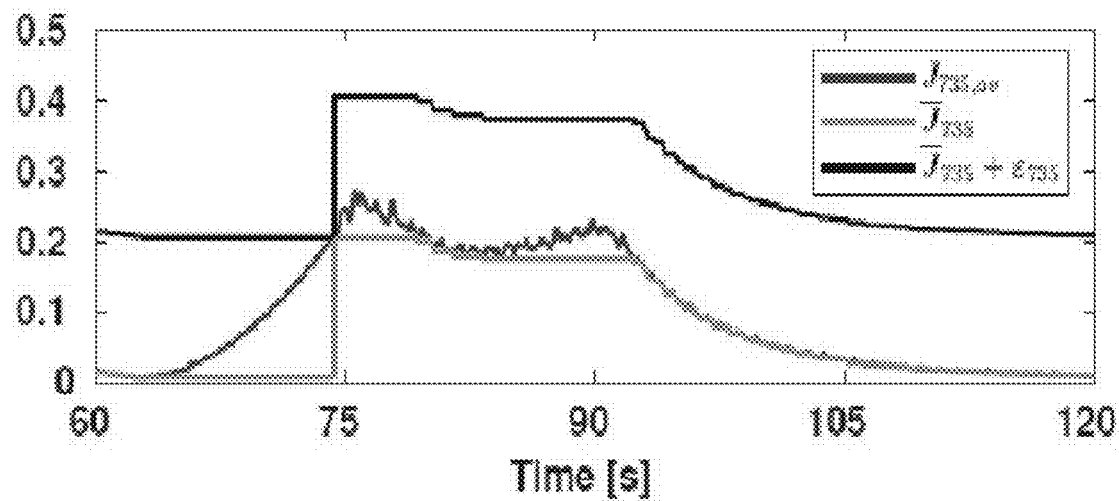

FIG. 9 shows with greater detail the substation real and reactive power during and after the linear increase in targets from $60 \le t \le 90$, and the corresponding effect on the objective function and switching threshold for node 735. The objective function initially increases as the targets increase without the substation real and reactive power being able to keep up. After the low-pass filtered objective function crosses the threshold of $J_{735}+_{\varepsilon 735}$, all probes are switched into "normal mode", at which point the probes are able to follow the changing target values and minimize the objective function.

Figure 10A:
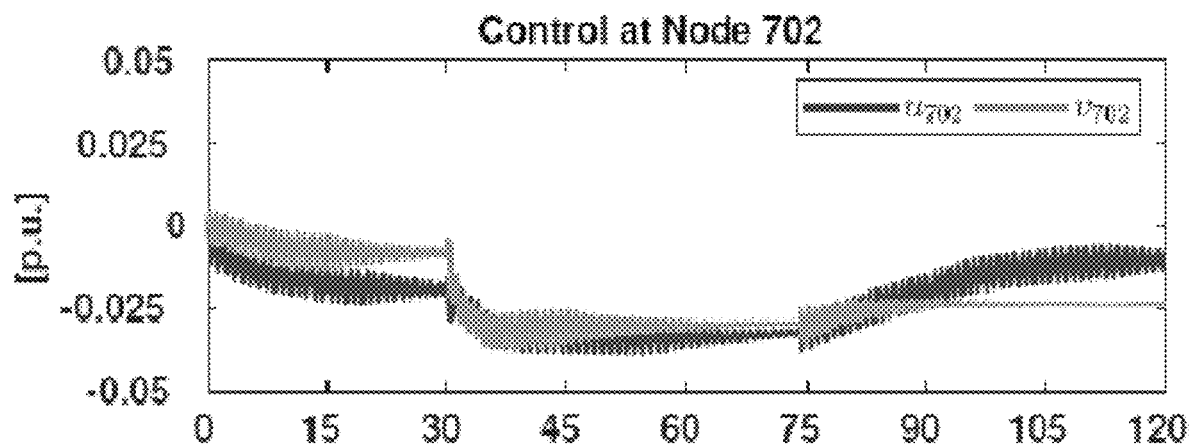
FIG. 10A depicts a graphical representation illustrating real and reactive power control at node 702 and FIG. 10 B depicts a graphical representation illustrating probe amplitudes at node 702.
Figure 10B:
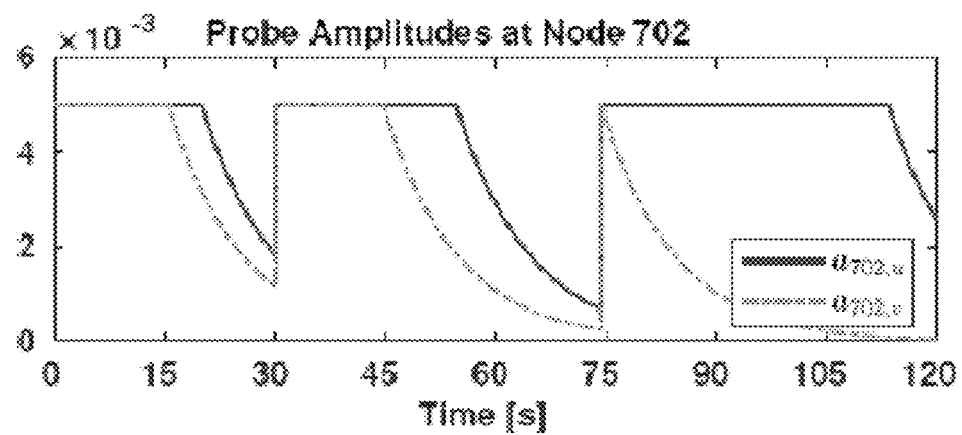
Figure 11A:
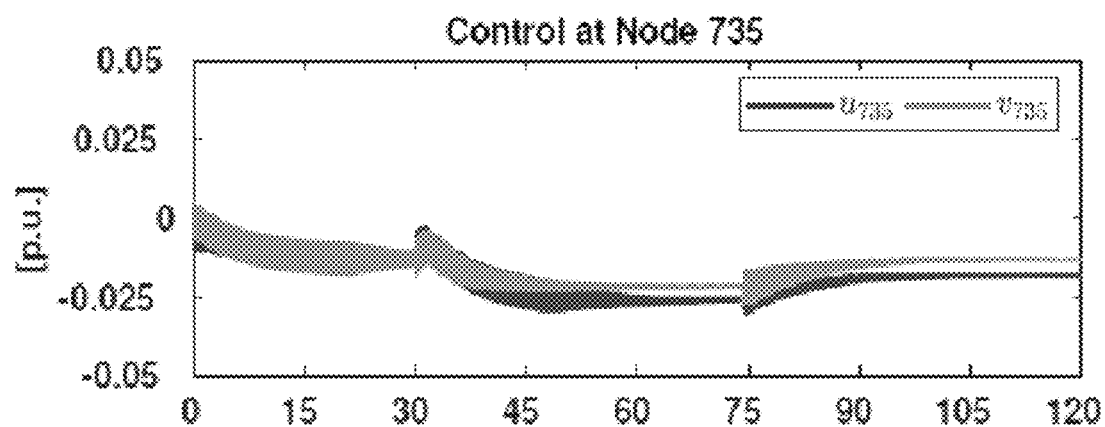
FIG. 11A depicts a graphical representation of real and reactive power control at node 725 and FIG. 11B depicts a graphical representation of probe amplitude at node 735.
Figure 11B:
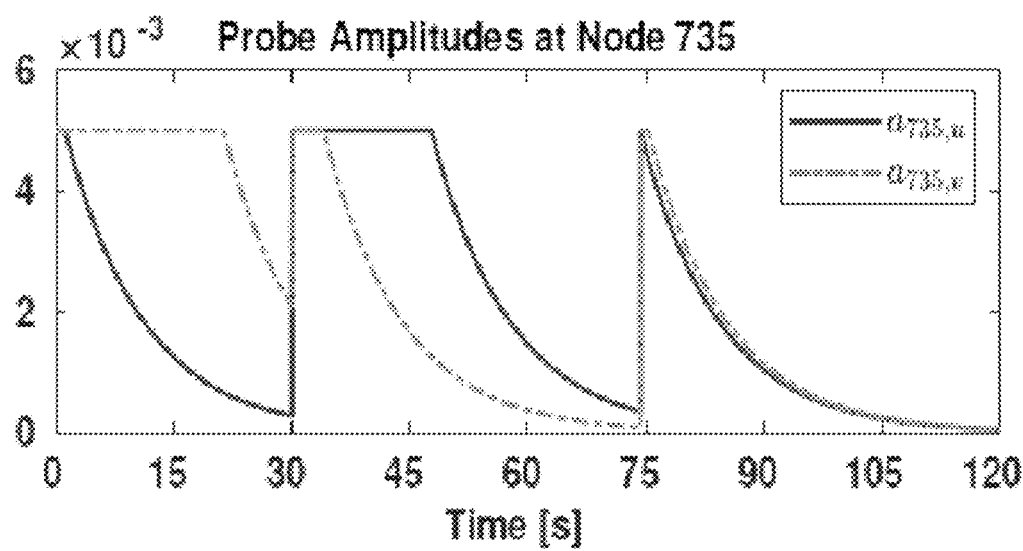

FIG. 10A depicts a graphical representation illustrating real and reactive power control at node 702 and FIG. 10 B depicts a graphical representation illustrating probe amplitudes at node 702. FIG. 11A depicts a graphical representation of real and reactive power control at node 725 and FIG. 11B depicts a graphical representation of probe amplitude at node 735. FIGS. 10A-B and 11A-B illustrate active and reactive power contributions, as well as the probe amplitudes of the real and reactive power probes ($a_{i,u}$ and $a_{i,v}$), for DER operating at node 702, and 735, respectively. It is evident that the real and reactive power probes enter "decay" mode at different times, for the controllers at nodes 702 and 735.

One or more embodiments use 2D-ES to control DER active and reactive power contributions with the intention of enabling substation power target tracking. The previously designed control scheme (see Equation [9]) is augmented with an equilibrium-based switching criterion to enable the individual DER dither signals to exponentially decay once the controllers had achieved their optimum values.

It should be appreciated that the presence of the dither signal could adversely affect the distribution system. The frequency of the individual probes is largely a design choice. The ES algorithm (in both theory and practice) has been shown to converge for a variety of different frequency choices. There are some parts of the signal spectrum where it would be undesirable to add energy (to avoid flicker, for example). However, there are other parts of the spectrum that could be relatively noise free that, were probing to occur at these frequencies, would not cause adverse system effects.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. An operating system coupled to and controlling at least one Distributed Energy Resource (DER) in a smart grid, the operating system comprising:
    a network system having first and second inputs and one output, the network system mapping all active and reactive power of power flows of the smart grid and providing measurements of an objective function;
    a plurality of 2-dimensional Extremum Seeking (2D-ES) controllers operating in parallel to minimize, or maximize, a same value of the objective function, each of the 2D-ES controllers comprising:
        an active power loop that governs an active power contribution, the active power loop in communication with the first input and the output, wherein the active power loop receives the measurements of the objective function which contain static and oscillatory components, wherein the active power loop comprises a highpass filter, a multiplier, a lower pass filter, an integrator and a summation device;
        a reactive power loop that governs a reactive power contribution, the reactive power loop in communication with the second input and the output, wherein the reactive power loop receives the measurements of the objective function which contain the static and oscillatory components, wherein the reactive power loop comprises a highpass filter, a multiplier, a lower pass filter, an integrator and a summation device,
    wherein the plurality of 2D-ES controllers work in a normal mode or a decay mode, wherein in response to a derivative of an averaged version of the objective function exceeding a predetermined value or in response to a value of the objective function deviating away from a predefined value, the plurality of 2D-ES controllers exit the decay mode and enter the normal mode.

2. The operating system of claim 1, wherein highpass filter in the active power loop removes the static/DC (Direct Current) component of the measurements of the objective function, forming first filtered signals.

3. The operating system of claim 2, wherein the multiplier device in the active power loop is in communication with the highpass filter in the active power loop and multiplies the first filtered signals with a first cosine function forming first multiplied signals.

4. The operating system of claim 3, wherein the lowpass filter in the active power loop is coupled to the multiplier device in the active power loop to receive the first multiplied signals and form second filtered signals.

5. The operating system of claim 4, wherein the integrator device in the active power loop is coupled to the lowpass filter in the active power loop to receive the second filtered signals and form first integrated signals.

6. The operating system of claim 5, wherein the summation device in the active power loop is coupled to the first input and the integrator device in the active power loop to receive the first integrated signals and sum the first integrated signals with a second cosine signal with a time-varying amplitude.

7. The operating system of claim 1, wherein highpass filter in the reactive power loop removes the static/DC (Direct Current) component of the measurements of the objective function, forming third filtered signals.

8. The operating system of claim 7, wherein the multiplier device in the reactive power loop is in communication with the highpass filter in the reactive power loop and multiplies the third filtered signals with a first sine function forming second multiplied signals.

9. The operating system of claim 8, wherein the lowpass filter in the reactive power loop is coupled to the multiplier device in the reactive power loop to receive the second multiplied signals and form fourth filtered signals.

10. The operating system of claim 9, wherein the integrator device in the reactive power loop is coupled to the lowpass filter in the reactive power loop to receive the fourth filtered signals and form second integrated signals.

11. The operating system of claim 10, wherein the summation device in the reactive power loop is coupled to the second input and the integrator device in the reactive power loop to receive the second integrated signals and sum the second integrated signals with a second sine signal with a time-varying amplitude.

* * * * *